July 17, 1934.  L. GROSS  1,966,498
FLUID MEASURING AND DISPENSING APPARATUS
Filed May 4, 1933  3 Sheets-Sheet 1
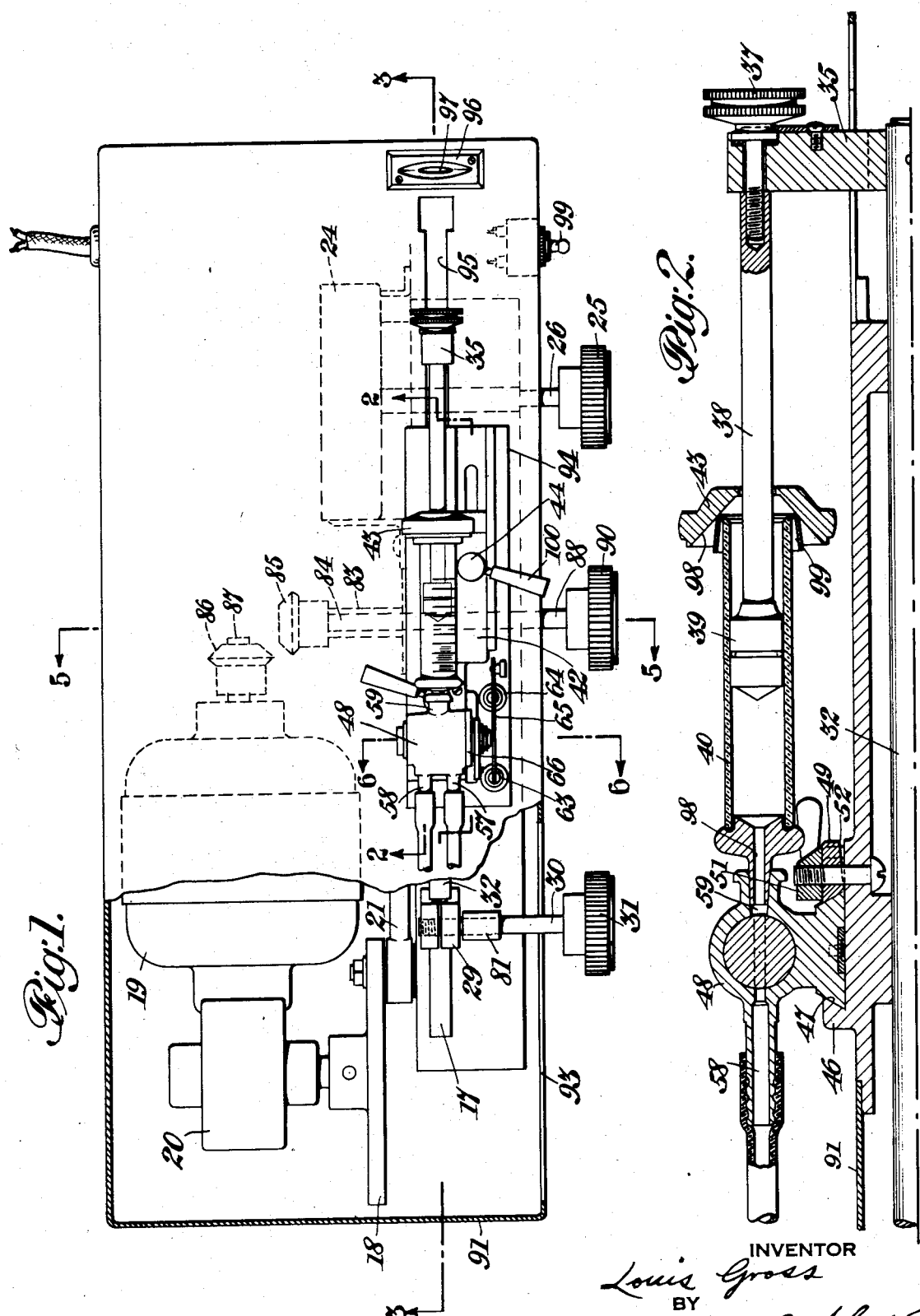
INVENTOR
Louis Gross
BY
Ashley & Ashley
ATTORNEYS July 17, 1934.  L. GROSS  1,966,498

FLUID MEASURING AND DISPENSING APPARATUS

Filed May 4, 1933  3 Sheets-Sheet 2

INVENTOR
Louis Gross
BY
Ashley & Ashley
ATTORNEYS

July 17, 1934.　　　　　　　　L. GROSS　　　　　　　1,966,498
FLUID MEASURING AND DISPENSING APPARATUS
Filed May 4, 1933　　　3 Sheets-Sheet 3
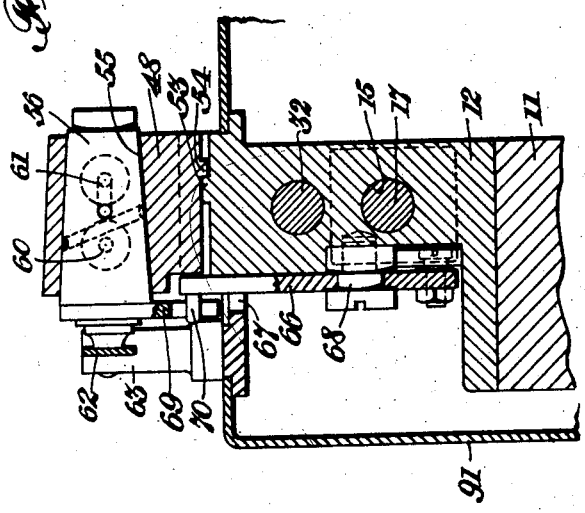
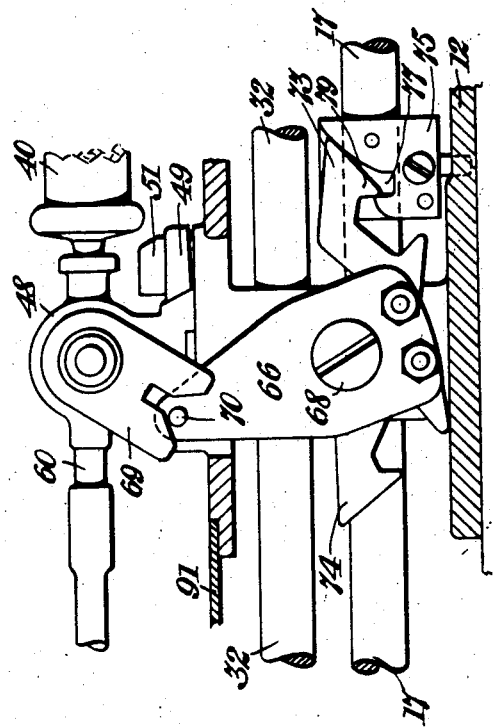
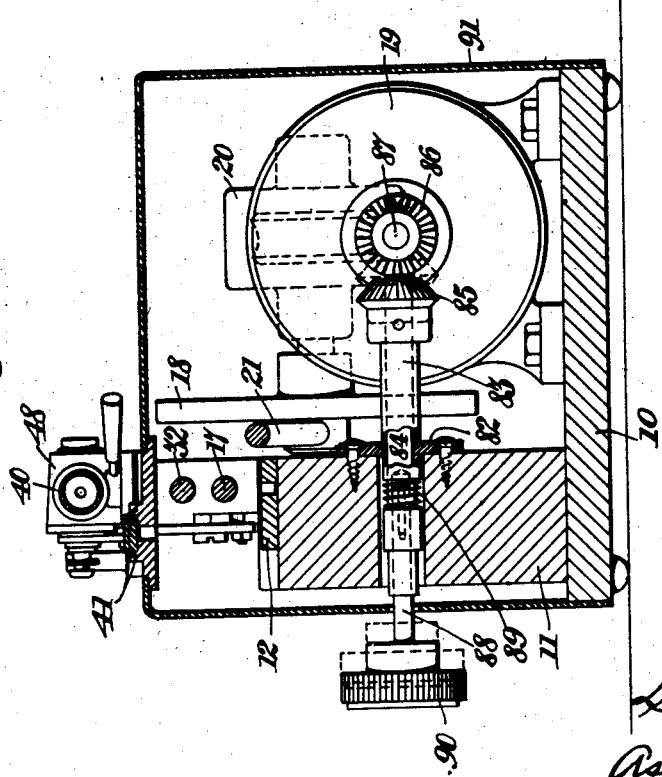
INVENTOR
Louis Gross
BY
Ashley & Ashley
ATTORNEYS Patented July 17, 1934

1,966,498

UNITED STATES PATENT OFFICE 1,966,498

FLUID MEASURING AND DISPENSING APPARATUS

Louis Gross, New York, N. Y.

Application May 4, 1933, Serial No. 669,289

6 Claims. (Cl. 103—227)

My invention relates to fluid measuring and dispensing apparatus and the principal object of my invention is to provide an improved apparatus of this character capable of repeatedly delivering accurately predetermined quantities of fluid for various technical and laboratory purposes, such as automatic pipetting required in connection with Wassermann tests, agglutinations, precipitations, water analysis, milk analysis, loading of ampoules, transfusions, and such other procedures as require the accurate measurement and repeated delivery of definite volumes of fluid. The features of novelty are hereinafter more fully set forth.

Referring to the drawings which form a part of this specification:

Figure 1 is a plan view of my improved apparatus from which a portion of the casing has been broken away to reveal the general arrangement of the housed parts of the mechanism.

Figure 2 is an enlarged longitudinal section taken on lines 2—2 of Figure 1.

Figure 5 is a sectional view taken on lines 5—5 of Figure 1.

Figure 6 is a sectional view taken on lines 6—6 of Figure 1.

Figure 7 is a detail view of the valve operating mechanism on an enlarged scale.

Figure 3:
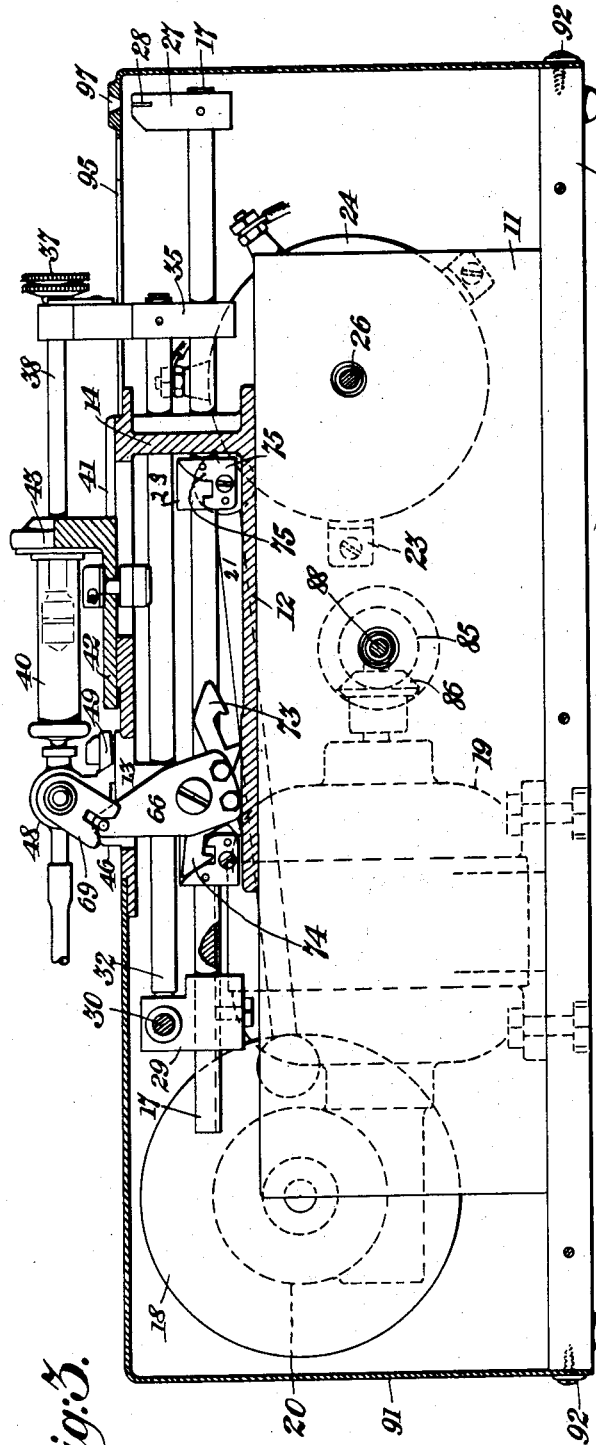
Figure 3 is a front side elevation of the apparatus, partly in section.

A base, comprising a plate 10 and an upwardly extending supporting portion 11, provides a firm foundation for the working parts of the apparatus. Mounted on the top of the portion 11 is a bench-like metal frame 12 having upwardly extending walls 13 and 14, respectively, which are bored to provide bearings 15 and 16 for a cylindrical rod 17 which extends beyond the walls at each end and is arranged to slide back and forth. This rod 17 is regularly reciprocated by a disc crank 18 driven by electric motor 19 thru a speed reducing worm gear housed at 20, the connecting rod 21 of the crank having a bearing formed on a block 23 fixed to the shaft 17.

A rheostat 24 is provided in circuit with the motor to control its speed and is regulated by means of the knob 25 mounted on a rod 26 which extends thru the portion 11 and connects with the rheostat. The gear reduction housed at 20 together with the rheostat permits a range of crank speeds from approximately forty-five to about one hundred and twenty per minute.

Fixed on one extreme end of the rod 17 is an upwardly extending abutment block 27 having a thin plate 28 transversely embedded in the top thereof to serve as an indicator in adjusting the apparatus as will hereafter appear. An upwardly extending abutment block 29 is also mounted on the rod 17 adjacent its opposite end. This block is split downwardly from its top and may be fixed in various adjusted positions on the rod by means of the screw threaded shaft 30 which extends therethru and operates to draw the split portions of the block toward each other and thus grip the rod. The shaft 30 is rotated by knob 31 mounted on the end thereof which also serves as a handle in moving the block 29 into adjusted position on the rod 17.

The abutment blocks 27 and 29, respectively, are adapted to alternately engage opposite ends of a short cylindrical rod or tube 32 which is supported in bearings 33 and 34 of the frame directly above the rod 17. Fixed on the upper rod 32 adjacent its right-hand end is a bracket 35 which is provided with a bore at 36 thru which the lower rod 17 extends in fitted relation, thereby preventing rotation of the upper rod and bracing the bracket.

The upper end of the bracket 35 is provided with a bore thru which extends a thumb screw 37, the thread of which engages a thread formed in the external end of a syringe piston rod 38, said piston rod having a piston 39 fixed at its opposite end tightly fitting the graduated cylinder of a standard syringe pump 40.

The top of the frame 12 is provided with a longitudinally extending guideway 41 in which is fitted a slide 42 formed with a conically shaped end bracket 43, said slide being adjustable in said guideway and having a set screw 44 extending therethru and thru a longitudinal slot 45 formed in the top of the frame to hold the slide in adjusted position so that the end bracket 43 will abut and support one end of the syringe cylinder.

Integral with the top of the frame 12 is an abutment 46, undercut at 47, against which the base of a valve casing 48 is held by an undercut clamp 49. A screw 50 is fixed in the top of the frame and extends thru the clamp 49. A nut 51 is threaded on the upper end of said screw and has its under surface cammed and bearing against the side of the clamp adjacent the valve casing to rock the clamp into locked engagement with the valve casing, the downwardly extending pins 52 fixed in the clamp serving as fulcrums for the rocking movement imparted by the nut 51.

The valve casing 48 is transversely positioned by stop lugs 53 and 54 fixed in the top of the frame and in the base of the valve casing, respectively, as will be readily understood.

The valve casing is provided with a tapered bore 55 in which a tapered plug valve 56 is rotatably fitted. The valve casing is provided with an inlet passage 57 and an outlet passage 58 on one side, and a single passage 59 on its opposite side serving as both inlet and outlet in communication with the syringe. The plug valve 56 is provided with a port 60 leading from the inlet passage 57 to the passage 59 when the valve is in one position, the syringe filling position, and a port 61 leading from the passage 59 to the outlet passage 58 when in the syringe discharging position, the valve being turned approximately one sixth of a revolution at each alternate stroke of the piston 39.

The tapered valve 56 is held in position in the casing by a gate 62 which is supported on the upper ends of two pillars, 63 and 64, fixed on the top of the frame 12, the gate being hinged on one pillar and its opposite end resting in a slot 65 formed in the opposite pillar.

The valve is actuated by a lever 66, the upper end of which extends thru a slot 67 in the top of the frame and is fulcrumed on the shank of a screw 68 which extends thru the lever into a wall of the frame. Mounted on the large end of the valve adjacent the lever is a bifurcated arm 69, formed as shown, and a pin 70 carried by the upper end of the lever 66 extends between the divisions of the arm to oscillate the valve and thus alternately align the valve ports 60 and 61 with the passages of the valve casing.

Carried on the lower end of the lever 66, below its fulcrum, are latches 73 and 74 which are formed as shown and extend longitudinally in opposite direction from the pivots 71 and 72, respectively, by means of which the latches are hinged to the lever. Mounted on the front face of the block 23 is a plate 75 formed to provide an inclined surface 76 and a detent 77 at the lower end of the incline, which detent is adapted to be engaged by the hook 79 of the latch 73 at the end of the stroke of rod 17 in that direction, the hook 79 being elevated into engaging position by the inclined surface 76 (see Figure 3). Upon the initial reverse movement of the rod 17, the lower end of the lever 66 is moved, causing the valve to be rotated to open communication thru the valve to the inlet passage of the syringe, whereupon a slight further movement of the lever 66 elevates the latch pivot 71 to a degree which causes the hook 79 on the latch to disengage from the detent 77 of the receding plate 75.

Figure 4:
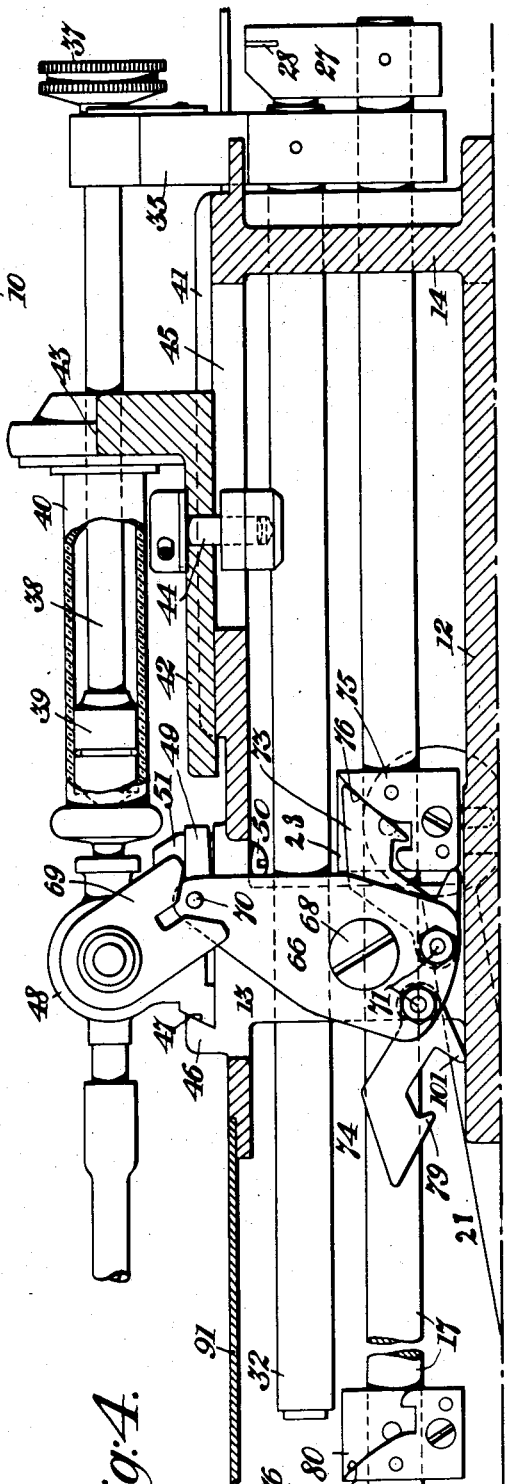
Figure 4 is an enlarged view of a portion of the apparatus as shown in Figure 3 and illustrates the arrangement of the mechanism at a different phase in its operating cycle.

A block and plate combination 80, constructed similar to the block 23 and plate 75, is fixed on the rod 17 to engage with the latch 74 and operates the lever in a reverse direction to close the inlet passage and open the outlet passage of the valve at the end of the stroke of rod 17 in the opposite direction. (See Figure 4.)

As illustrated in Figure 5, a sleeve 83 is affixed to the inner side of the plate 11 by means of an integral bracket 82. A shaft 84 extends thru the plate 11 and thru the sleeve 83 and carries a bevel gear 85 on its inner end adapted to mesh with gear 86 on the motor shaft. Gear 85 is normally held disengaged by a spring 89 interposed between the end of sleeve 83 and a flange formed on the shaft 84 as shown. The shaft 84 is socketed at its opposite end to receive a bifurcated rod 88 which engages a transverse pin thru the shaft and carries knob 90.

By this construction the gears may be manually meshed and the motor shaft turned to set and adjust the device. To accomplish this the knob 90 is pressed inward to axially move the rod 88 and shaft 84 against the resistance of the spring 89 and thereby mesh the gears, whereupon the knob is rotated until the desired adjustment is effected. The rod 88 may be instantly withdrawn from the socket in shaft 84, as will be readily understood.

Rod 26, carrying knob 25, is similarly bifurcated and removably coupled to the shaft of the rheostat. Rod 30, carrying knob 31, is also removable by simple withdrawal after it has been unscrewed from engagement with the adjustable abutment block 29.

After removing the knobs and rods on which they are mounted, a sheet metal casing 91 is lowered into position, as illustrated, and is fastened to the base plate 10 by screws 92. The casing is provided with openings to permit the rods 26, 30 and 88 to be inserted therethru and is slotted at 93 to permit rod 30 to move back and forth with the shaft 17 which carries it and to be adjustably positioned on the shaft as heretofore described. The top of the casing is provided with an opening at 94 which is shaped to conform to the top of the frame 12 and fit flush with the upper edges thereof. The casing is also provided with a longitudinally extending slot 95 thru which the bracket 35 upwardly extends, and an escutcheoned slot is also provided at 96 thru which indicator 28 may be seen when the rod 17 is at the end of its outward stroke.

The passage 59 of the valve casing 48 is conically shaped to receive the cone-shaped end of the syringe and effect a tight joint therewith, and the opposite end of the syringe is abutted by the inner conical wall 98 of the end bracket 43, a suitable packing 99 being interposed to prevent injuring the glass cylinder 40.

The motor circuit is controlled by a suitable switch 99 carried on the front side of the casing and the speed of the motor is governed by the rheostat 24 as heretofore described.

The syringe is assembled and the apparatus set to meter the desired quantities of fluid as follows: Having selected the syringe to be used, which includes the piston and piston rod, the piston is manually forced to the discharge end of the syringe cylinder and, after loosening the set screw 44 and moving the slide 42 with its bracket 43 to the right side as far as possible, the piston rod is passed thru the opening in the centre of the bracket 43 and the nozzle of the syringe is then inserted in the mouth portion of the valve casing, whereupon the bracket 43 is placed in tight abutment with the cylinder 40 and held in position by the set screw 44 operated by its handle 100. The piston rod is then attached to the bracket 35 by the screw 37.

The motor shaft is then rotated by turning the knob 90, after pushing inwardly thereon to cause the gear wheels to mesh, until the shaft 17 has moved to the end of its stroke to the right, at which point the indicator 28 will be visible thru the slot 97. Knob 31 is next rotated to loosen the block 29 on rod 17, after which bracket 35 is moved together with shaft 32 and piston rod 38 until the piston is located in the cylinder at the desired point relative to the graduations thereon which indicate the amount of fluid to be delivered on each delivery stroke of the piston. Knob 31 is then moved to the right until block 29 abuts the left end of the shaft 32 and is then rotated to secure the block on shaft 17, as will be readily understood.

Thus assembled and adjusted, the apparatus is placed in operation by closing switch 99. In moving to the left, the shaft 17 carries the abutment block 27 into contact with the end of shaft 32 and moves it, together with the bracket 35 and piston rod 38 to the end of its stroke in that direction, thus expelling all fluid in cylinder 40 thru the outlet passages of the valve, and on its opposite stroke it carries block 29 against the other end of shaft 32 and moves it to the right a distance corresponding to the suction stroke of the piston which is equal to the linear distance of the crank movement after contact has been made between the block 29 and rod 32. Therefore, the stroke of the piston is always controlled by the position of block 29 on shaft 17.

The valve is operated at the end of each stroke of the shaft 17 after the piston has come to rest. The valve is oscillated to open and close the inlet and outlet passages alternately by the movement of shaft 17 by means of the latch plates 75 and 80, respectively, which alternately engage the latches 73 and 74, respectively, at the end of each stroke of the shaft 17. The inclined surface 76 of the latch plate first abuts the inclined surface on the under side of the latch and lifts the latch as the shaft finishes its stroke. As the shaft reverses its movement, the hook 79 drops into the detent 77, thus interlocking the parts and causing the lever 66 to swing on its pivot to move the arm 69 a predetermined distance required to actuate the valve. During this movement the latch pivot 71 is moved upwardly in an arc so that hook 79 is lifted from the detent 77 when the valve has been actuated, thus uncoupling the parts. The projecting portions 101 of the latches prevent the latch hooks from dropping out of a position necessary to effect the coupling operation.

It will be noted that the apparatus, constructed as above set forth, operates to repeatedly perform four separate and consecutive movements, i. e.: The valve is first actuated to open communication between the syringe and the inlet passage. The syringe piston is then drawn out to suck in a predetermined quantity of fluid, whereafter the valve is again actuated to close the inlet passage and to open communication between the syringe and the outlet passage. Finally, the syringe is completely evacuated. The piston is always at complete rest when the valve is operated.

By thus separating the several operations of the stroke cycle, it is possible to achieve great accuracy in metering the fluid, accuracy depending entirely upon the precision with which the syringe is graduated and not at all upon the operating mechanism, and this remains true even after appreciable wear or abuse.

Having thus described my invention, I claim as new:

1. An apparatus of the character described comprising a syringe pump having a piston and a piston rod, a shaft adapted to be reciprocated longitudinally a fixed distance parallel to said piston rod, a member attached to the piston rod and movable therewith, abutments carried by the shaft arranged to alternately engage said member to move the piston intermittently in opposite directions a distance less than the movement of the shaft, and means for adjusting one of said abutments on the shaft to vary the stroke of the piston.

2. An apparatus of the character described comprising a syringe pump having a piston and a piston rod, valve means mounted in cooperative relation therewith to admit fluid to said pump and to lead fluid therefrom, a shaft adapted to be reciprocated longitudinally a fixed distance parallel to said piston rod, means operable by the shaft to move the piston intermittently in opposite directions a distance less than the movement of the shaft, and automatic means operable by the shaft for intermittently operating said valve means during each intermission between strokes of the piston.

3. An apparatus of the character described comprising a syringe pump having a piston and a piston rod, a valve at the open end of the pump for alternately opening and closing communication between the pump and an inlet passage and an outlet passage, a shaft adapted to be reciprocated longitudinally a fixed distance parallel to said piston rod, a member attached to the piston rod and movable therewith, means carried by the shaft arranged to alternately engage said member to move the piston intermittently in opposite directions a distance less than the movement of the shaft, and means intermittently operable by the shaft for automatically reversing the ports of said valve during each intermission between strokes of the piston.

4. An apparatus of the character described comprising a syringe pump having a piston and a piston rod, a valve at the open end of the pump for alternately opening and closing communication between the pump and an inlet passage and an outlet passage, a lever for reversing the ports of said valve, a shaft adapted to be reciprocated longitudinally a fixed distance parallel to said piston rod, a member attached to the piston rod and movable therewith, means carried by the shaft arranged to alternately engage said member to move the piston intermittently in opposite directions a distance less than the movement of the shaft, and means carried by the shaft adapted to connect with said lever at the end of each shaft stroke and to operate the lever and disconnect therefrom on the initial movement of the shaft at the beginning of each stroke thereof.

5. An apparatus of the character described comprising a shaft adapted to be regularly reciprocated a fixed distance longitudinally, a frame, a graduated syringe pump having a piston and a piston rod removably attached to the frame, said rod extending parallel to the shaft, a member attached to the piston rod and movable therewith, abutments carried by the shaft arranged to alternately engage said member to move the piston intermittently in opposite directions a distance less than the movement of the shaft, and means for adjusting one of said abutments on the shaft to vary the stroke of the piston; a valve supported by the frame at the open end of the pump for alternately opening and closing communication between the syringe and an inlet passage and an outlet passage, and means intermittently operable by the shaft for reversing the ports of the valve during each intermission between strokes of the piston.

6. An apparatus of the character described comprising a shaft adapted to be regularly reciprocated a fixed distance longitudinally, a frame, a graduated syringe pump having a piston and a piston rod removably attached to the frame, said rod extending parallel to the shaft, a member attached to the piston rod and movable therewith, abutments carried by the shaft arranged to alternately engage said member to move the piston intermittently in opposite directions a distance less than the movement of the shaft, and means for adjusting one of said abutments on the shaft to vary the stroke of the piston; a valve supported by the frame at the open end of the pump for alternately opening and closing communication between the pump and an inlet passage and an outlet passage, a lever for reversing the ports of said valve, and means carried by the shaft adapted to connect with said lever at the end of each shaft stroke and to operate the lever and disconnect therefrom on the initial movement of the shaft at the beginning of each stroke thereof while the piston is at rest.

LOUIS GROSS.